Jan. 14, 1936.  R. S. NELSON  2,027,927
ABSORPTION REFRIGERATION
Filed Oct. 6, 1933
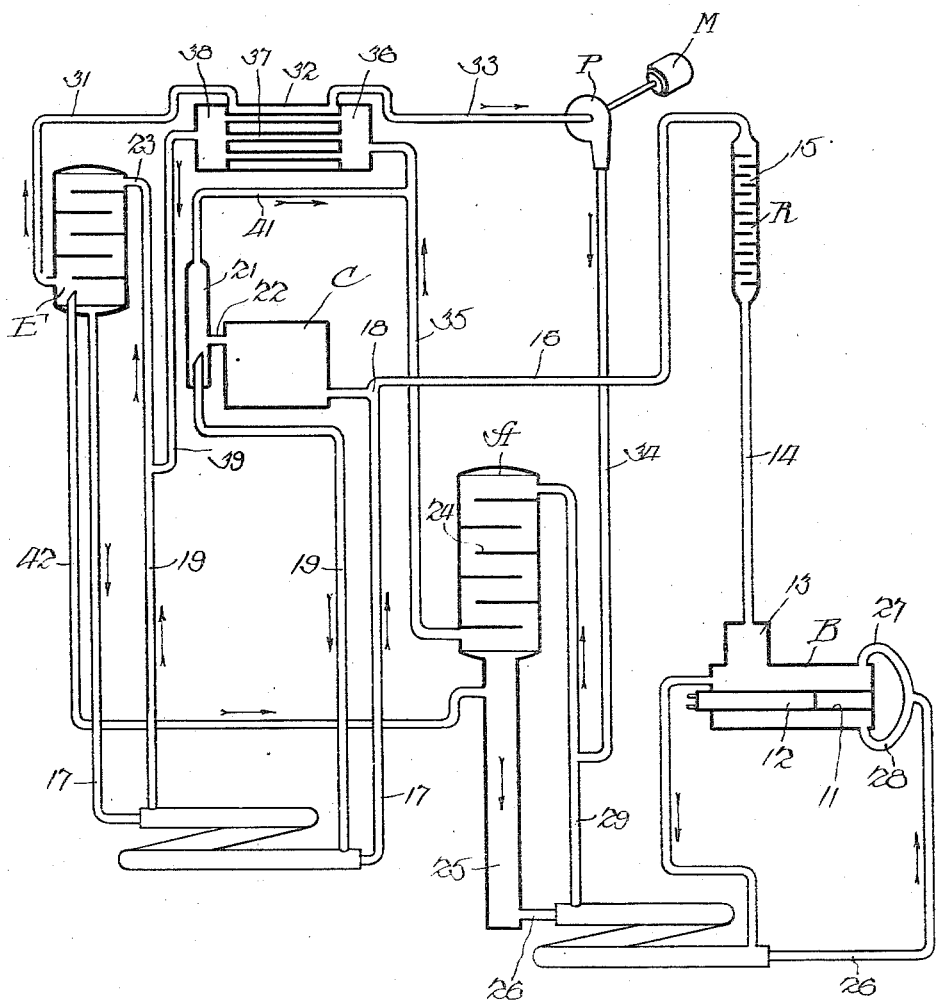
Inventor:
Rudolph S. Nelson.
By Harry S. [Demarest], Atty.

Patented Jan. 14, 1936

2,027,927

UNITED STATES PATENT OFFICE 2,027,927

ABSORPTION REFRIGERATION

Rudolph S. Nelson, Rockford, Ill., assignor to The Hoover Company, North Canton, Ohio, a corporation of Ohio Application October 6, 1933, Serial No. 692,366

9 Claims. (Cl. 62—119.5)

This invention relates to continuous absorption refrigerating apparatus and more particularly to that type which employs an inert gas as a pressure equalizing medium.

As disclosed in the U. S. patent to Geppert, No. 662,690, it is known to employ an inert gas as a pressure equalizing agent in a continuous absorption refrigerator, and to circulate the inert gas between the evaporator and the absorber by means of a power driven fan. It is also known, as disclosed in the U. S. applications of Edmund Altenkirch, Serial Numbers 99,890, filed April 5, 1926, and 101,745 filed April 13, 1926, to employ what is known as a resorber instead of a condenser in an inert gas unit. An important advantage in using a resorber results from the fact that freezing temperatures can be produced even though the pressure in the apparatus is at or near atmospheric.

It is an object of the present invention to provide improved means for circulating the inert gas in a continuous absorption refrigerating system and for mixing the inert gas with the absorption liquid in the absorber.

It is a further object to provide an improved arrangement of inert gas circulation in a resorber system and in which the inert gas is brought into intimate contact with the strong resorber solution entering the evaporator.

It is a further object of the invention to provide improved means for circulating absorption liquid between the boiler and the absorber of a continuous absorption refrigerating system.

It is a further object of the invention to provide improved means for circulating the resorber solution between the resorber and the evaporator of a resorber type continuous absorption refrigerator.

Other objects and advantages reside in certain novel features of the arrangement and construction of parts as will be apparent from the following description taken in connection with the accompanying drawing in which:

The single figure is a diagram illustrating one way of carrying out the principles of the present invention. The figure is not drawn to scale and the vessels are only located at approximately the correct height, it being understood that since liquid levels stand in the apparatus at various heights, the vessels should be located in accordance with known engineering practice.

Referring to the drawing in detail, a continuous absorption refrigerating apparatus is shown as consisting of a boiler B, a rectifier R, an absorber A, a resorber C, an evaporator E and a gas pump P as essential elements, these vessels being connected to form the complete refrigerating system by various conduits some of which are in heat exchange relation.

The boiler B is of the usual construction, having a horizontal tube extending therethrough as shown at 11 and adapted to receive an electrical heating element or other heating means 12 for drying off refrigerant from the absorption solution flowing through the boiler. The upper portion of the boiler is provided with a dome 13 which is connected by a conduit 14 to the rectifier R. As shown, the rectifier R may consist merely of a vertical pipe provided with a number of baffle plates shown at 15.

The upper portion of the rectifier R is connected by means of the pipe 16 with the resorber C, pipe 16 joining the liquid conduit 17 just before it enters the resorber C as shown at 18.

The resorber C is merely a closed vessel. It is connected to lower portion of the evaporator by means of the conduit 17 mentioned above, this conduit passing some distance beneath both the evaporator E and the resorber C and over a portion of its length being in heat exchange relation with a similar liquid conduit 19. The right hand leg of conduit 19 is connected to a small gas separation vessel 21, which is in turn connected to the resorber C by means of a short conduit 22. The left hand leg of conduit 19 is connected to the top of the evaporator as shown at 23. As will presently be explained conduits 17, 19, 21 and 22 provide means for circulating a strong resorption solution between the evaporator and the resorber. These conduits together with the vessels E and C may accordingly be called the resorber circuit.

Absorption liquid is also circulated in the boiler and the absorber. The absorber A which may be of the usual construction consisting merely of a vertical tank provided with a number of baffle plates 24, is connected to a reservoir 25 at its lower end. The lower end of the reservoir is connected by means of conduit 26 to the boiler B, the connection of the conduit 26 to the boiler consisting of a yoke or branched portion connecting to the top of the boiler as shown at 27, and to the lower portion thereof as shown at 28. This provides means for preventing surges in the boiler from adversely affecting the circulation of the absorption liquid. A conduit 29 also is connected to the boiler and extends downwardly in heat exchange relation with a portion of the conduit 26 and thence upwardly to the top of the absorber A. The conduits 26 and 29 together with the absorber A, the reservoir 25 and the boiler B may be said to constitute the absorption liquid circuit.

Inert gas is circulated between the evaporator and the absorber and the means for circulating the inert gas is also used in circulating the absorption liquid over its circuit between the boiler and the absorber and the resorption liquid over its circuit between the evaporator and the resorber. Gas conduit 31 is connected to the lower portion of the evaporator and passes upwardly and into the central compartment 32 of an inert gas heat exchanger from which it flows to the conduit 33 to the gas pump P. A conduit 34 conveys the gas from the pump P to a point some distance below the absorber where it joins the conduit 29 through which the gas may flow to the top of the absorber A. The conduit 35 is connected to the lower portion of the absorber and conveys gas from the absorber to the right hand compartment 36 of the gas heat exchanger. A number of tubes 37 connect the right hand chamber 36 of the gas heat exchanger to the left hand compartment 38, in accordance with known practices. The left hand chamber 38 is connected by means of a gas conduit 39 to the resorber conduit 19, the point of juncture being some distance below both the evaporator and the resorber.

In order to vent any gas which may have found its way into the resorber C a conduit 41 connects the top of the small chamber 21 to the gas conduit 35.

Some means must also be provided for returning any excess of absorption liquid which may have found its way into the resorber solution circuit back to the absorption liquid circuit. For this purpose an overflow pipe 42 is connected to the lower portion of the evaporator and to the reservoir 25.

The pump P mentioned above is driven by an electric motor M which may be connected to the pump by a shaft passing through a stuffing box in the pump casing. The pump itself may be of any suitable known construction. For purposes of regulating proper operation of the system the pump should preferably be of such a type that the pressure generated in the conduits 34 may be varied so as to regulate the flow of inert gas between the evaporator and the absorber. It will also be of material aid in regulating proper flow of fluids through the various conduits of the system to provide restrictions or valves capable of adjustment in various places. Such regulating valves should be placed in the left hand legs of the conduits 19 and 29 at points just below the points of juncture of these conduits with the gas conduits 39 and 34 respectively for otherwise it might be difficult to regulate the flow of resorber solution in its circuit and absorption solution in its circuit as compared to the amount of inert gas circulated. Valves may also and preferably are provided in the gas conduits 34 and 39. As mentioned above the location of the various vessels may be varied to suit the requirements for various sizes of systems. The relative height and location of the vessels will also be instrumental in controlling the relative amounts of circulation of the fluids in the system over their respective circuits. In any case the boiler will be located below the other vessels and subjected to the highest pressure. The absorber and resorber will operate at a slightly lower pressure and the evaporator at a still lower pressure.

The system may be charged with ammonia as refrigerant, water as absorption and resorption liquid and hydrogen or air, or a mixture of these two gases as the inert gas. Various other fluids may, of course, be used.

As is now well known a system operating with a resorber is capable of producing refrigeration with the internal pressure of the apparatus comparatively low even though the above mentioned fluids are employed. For this reason the unit may not necessarily be hermetically sealed and the stuffing box mentioned above, through which energy is transmitted to the pump P will offer no serious hindrance to proper operation of the unit.

There are four separate fluid circuits set up in the system.

Referring first to the absorption liquid circuit, the absorption liquid leaving the boiler B passes through the conduit 29 to the point where this conduit is connected to the gas conduit 34. As gas passes upwardly through the conduit 29 above this point of juncture it lifts the absorption liquid with it into the top of the absorber A, the inert gas and absorption liquid being intimately mixed at this time. After trickling downwardly over the baffle plates 24 the absorption liquid flows into the reservoir 25 and returns to the boiler through the conduit 26 under the action of gravity.

The resorption solution passes downwardly from the evaporator E through the conduit 17 and then upwardly through the right hand leg of this conduit into the resorber C, this flow being accomplished by gravity. The solution then overflows through the conduit 22 into the small vessel 21 from which it passes downwardly through the right hand leg of the conduit 19 and then upwardly through the left hand leg of this conduit to the point where it joins the gas conduit 39. The upper portion of the left hand leg of the conduit 19 also acts as a gas lift pump as bubbles of gas enter the conduit 19 from the conduit 39. The resorption solution is thus conveyed into the top of the evaporator and trickles downwardly over the baffle plate therein.

In order to circulate the inert gas between the evaporator and the absorber and to provide the necessary pressure to lift the solution in the conduits 19 and 29 the gas pipes are connected as noted above. Starting with the bottom of the evaporator the inert gas passes through the conduit 31, the central compartment 32 of the gas heat exchanger, gas conduit 33, pump P where the pressure is increased, then downwardly through the gas conduit 34, upwardly through the upper portion of the left hand leg 29, downwardly through the absorber A, upwardly through the conduit 35, thence through the gas heat exchanger compartment 36, tubes 37, compartment 38 and back to the evaporator through the conduit 39 and the upper portion of the left hand leg of the conduit 19.

As heat is applied to the boiler B, the refrigerant passes through another cycle this being upwardly through the conduit 14, the rectifier R and the conduit 16 into the resorber C where the refrigerant is absorbed in the resorption solution, there being little or no inert gas in the resorber. The refrigerant is conveyed into the evaporator through the conduit 19. In the evaporator, it evaporates out of the resorption solution into the inert gas, thus producing cooling effect. It then flows through the conduit 31, compartment 32, conduit 33, pump P, conduit 34 and the upper portion of the left hand leg 29, into the absorber A. In the upper portion of the left hand leg of the conduit 29 and in the absorber the refrigerant is absorbed by the absorption liquid and is conveyed back to the boiler through the reservoir 25 and the conduit 26.

One of the important features of the invention is the relation and location of the gas conduit 39 to the left hand leg of the conduit 19. Since the inert gas passing through the conduit 39 is comparatively free from refrigerant, and since the solution passing through the conduit 19 is of a high concentration, considerable evaporation of refrigerant out of the solution into the inert gas will take place in the upper portion of the left hand leg of the conduit 19, and this portion will become very cold. It may be accordingly bent into suitable shape such as a coil, and provide means for making ice cubes or the like while the main evaporator E is used to cool a refrigerator cabinet.

It will be apparent to those skilled in the art that throughout the inert gas circuit some refrigerant gas will be present and exert a partial pressure. This partial pressure and the partial pressure of the inert gas will differ in the various vessels depending on the concentration of the solutions therein. It is not intended, in the accompanying claims to limit the invention to any particular inert gas partial pressure in any particular vessel. Where the claims recite that the pressure of the gas is higher in one place than in another, the total pressure of the gas is meant, regardless of what proportion it may have of inert gas and refrigerant gas. In certain aspects the invention is not limited to an apparatus using inert gas. By means of a suitable gas pump, refrigerant gas alone might be used to promote circulation of liquids.

While only one embodiment of the invention has been shown and described herein, it is apparent that various changes may be made in the arrangement and construction of parts without departing from the spirit of the invention or the scope of the annexed claims.

I claim:

1. Continuous absorption refrigerating apparatus of the type in which an inert gas is used as a pressure equalizing agent and including a boiler, an absorber and an evaporator, gas conduits connecting the evaporator to the absorber for circulating inert gas between the evaporator and the absorber and for conveying refrigerant gas from the evaporator to the absorber, a gas pump located in one of said conduits for raising the pressure of the gas therein, and for circulating it between the evaporator and absorber through said gas conduits, conduits connecting the boiler and the absorber and forming a liquid circuit therebetween and means for conveying the gas under pressure from the pump into one of the liquid circuit conduits to thereby lift the liquid and cause the liquid to circulate over its circuit.

2. In a continuous absorption refrigerating system of the type in which an inert gas is used as a pressure equalizing agent, the combination of a boiler, an absorber, an evaporator, gas conduits for circulating the inert gas between the evaporator and the absorber and for conveying refrigerant from the evaporator to the absorber, mechanical pumping means in one of said conduits for raising the pressure of the gas therein to a total pressure higher than that normally prevailing in the evaporator and means for circulating absorption liquid between the boiler and the absorber and utilizing the gas at the raised pressure to promote the liquid circulation.

3. In a continuous absorption refrigerating system of the type in which an inert gas is used as a pressure equalizing agent, the combination of an evaporator, an absorber and a resorber, gas conduits for circulating the inert gas between the evaporator and the absorber and for conveying refrigerant gas from the evaporator to the absorber, means in one of said conduits for raising the pressure of the gas therein to a total pressure higher than that normally prevailing in the evaporator and means for circulating liquid between the evaporator and the resorber and utilizing the inert gas at the raised pressure to promote the liquid circulation.

4. In a continuous absorption refrigerating system, the combination of an evaporator wherein refrigerant gas may be generated, a resorber located below the evaporator, an absorber, a boiler located below the absorber, gas pumping means connected to the evaporator for removing gas from the evaporator and raising the pressure thereof, and means utilizing the gas at the raised pressure for lifting liquid from the level of the resorber into the evaporator and from the level of the boiler into the absorber.

5. In a continuous absorption refrigerating system, the combination of an evaporator for producing cold, an absorber, a boiler located below the absorber, gas pumping means forming part of the system for removing gas from a part of the system and raising the pressure thereof to a pressure on the gas over that normally prevailing in the absorber and means utilizing the gas at the raised pressure for lifting liquid from the level of the boiler into the absorber.

6. In a continuous absorption refrigerating system the combination of an evaporator, a resorber located below the evaporator, an absorber, a boiler located below the absorber, gas conduits for circulating an inert gas between the evaporator and the absorber and for conveying refrigerant gas from the evaporator to the absorber, means in one of said conduits for raising the pressure of the gas therein to a total pressure higher than that normally prevailing in the evaporator, said means including an electrically driven gas pump and means utilizing the gas at the raised pressure for lifting liquid from the level of the resorber into the evaporator and from the level of the boiler into the absorber.

7. In a continuous absorption refrigerating system the combination of an evaporator, a resorber located below the evaporator, an absorber, a boiler located below the absorber, gas conduits for circulating an inert gas between the evaporator and the absorber and for conveying refrigerant gas from the evaporator to the absorber, means in one of said conduits for raising the pressure of the gas therein to a total pressure higher than that normally prevailing in the evaporator, said means including an electrically driven gas pump and means utilizing the gas at the raised pressure for lifting liquid from the level of the resorber into the evaporator and from the level of the boiler into the absorber, the system utilizing ammonia as refrigerant, water as absorbent and air as the inert gas, and operating substantially at atmospheric pressure.

8. In a continuous absorption refrigerating system of the type in which an inert gas is used as a pressure equalizing agent, the combination of an evaporator, an absorber, power driven means for circulating the gas between the evaporator and the absorber, and for raising the total pressure of the gas to a pressure higher than that normally prevailing in the evaporator, means for supplying a liquid to the evaporator and means for intimately mixing the liquid with the gas at the raised pressure just prior to its entrance into evaporator.

9. Continuous absorption refrigerating apparatus of the type in which an inert gas is used as a pressure equalizing agent and including an absorber, a resorber and an evaporator, gas conduits connecting the evaporator to the absorber for circulating inert gas between the evaporator and the absorber and for conveying refrigerant gas from the evaporator to the absorber, a gas pump located in one of said conduits for raising the pressure of the gas therein and for circulating it between the evaporator and the absorber through said gas conduits, conduits connecting the evaporator and resorber and forming a liquid circuit therebetween and means for conveying gas under pressure from the pump into one of the liquid circuit conduits to thereby lift the liquid and cause the liquid to circulate over its circuit.

RUDOLPH S. NELSON.